Feb. 18, 1964

T. ONGARO 3,121,335

DYNAMIC BALANCING IN EVACUATED CHAMBER

Filed Oct. 21, 1959

INVENTOR.
THEODORE ONGARO
BY
Harry B. Keck
ATTORNEY

Feb. 18, 1964 T. ONGARO 3,121,335
DYNAMIC BALANCING IN EVACUATED CHAMBER
Filed Oct. 21, 1959 2 Sheets-Sheet 2

INVENTOR.
THEODORE ONGARO
BY
Harry B. Keck
ATTORNEY

United States Patent Office 3,121,335
Patented Feb. 18, 1964

3,121,335
DYNAMIC BALANCING IN EVACUATED CHAMBER
Theodore Ongaro, Columbus, Ohio, assignor to International Research and Development Corporation
Filed Oct. 21, 1959, Ser. No. 847,754
1 Claim. (Cl. 73—460)

The present invention relates to apparatus for dynamic balancing of rotors especially high speed rotors. More particularly the invention relates to dynamic balancing of rotors in an evacuated chamber.

The art of dynamic balancing is replete with mechanical supporting stands for rotatably mounting rotor elements undergoing dynamic observation for the purpose of balancing. For rotors which normally operate at relatively low speeds, such as 2,000 r.p.m., conventional balancing techniques are satisfactory. In such conventional observation, the rotor may be turned at a fraction of its normal operating speed, e.g., about 600 r.p.m. to determine the eccentricity of its mass distribution and to compensate therefor.

As technology has become increasingly complex, rotors are designed to operate at increasing speeds, for example, up to 20,000 r.p.m. and higher. In fact it is not uncommon to find rotors which operate at speeds of 60,000 to 120,000 r.p.m. At such speeds, the dynamic rotational forces introduce types of unbalance which are distinct from the mass eccentricity which is the type of unbalance compensated by conventional balancing techniques. Dynamic forces increase with the square of rotational speeds. Accordingly it is increasingly important that high speed rotors be tested for unbalance characteristics including mass eccentricity at their normal operating speeds. Frequently such high speed rotors include radial extensions in the form of turbine blades which serve as driven or driving surfaces during the normal operation of the rotor. Such radial extensions present substantial aerodynamic resistance as the rotor is turned at increasing speeds for observation purposes.

In order to cause rotation of high speed rotors, sufficient driving force must be provided to overcome its aerodynamic resistance. At normal atmospheric pressure such aerodynamic resistances are appreciable and enormous driving power may be required to attain the desired operating speeds at which the rotor should be observed for inspection of the high speed dynamic distortions.

It is an object of this invention to provide apparatus for observing the high speed dynamic distortion characteristics of high speed rotors in an evacuated chamber where the aerodynamic resistance is limited.

A further object of this invention is to provide an apparatus for enclosing a rotor balancing test stand within a housing which may be evacuated readily.

A still further object of this invention is to provide an evacuated chamber in which a high speed rotor driving shaft may be turned through driving connections associated with a rotary drive source positioned externally of the evacuated chamber.

These and other objects and advantages of the present invention will become apparent from the following detailed description by reference to the accompanying drawings in which.

Figure 5:
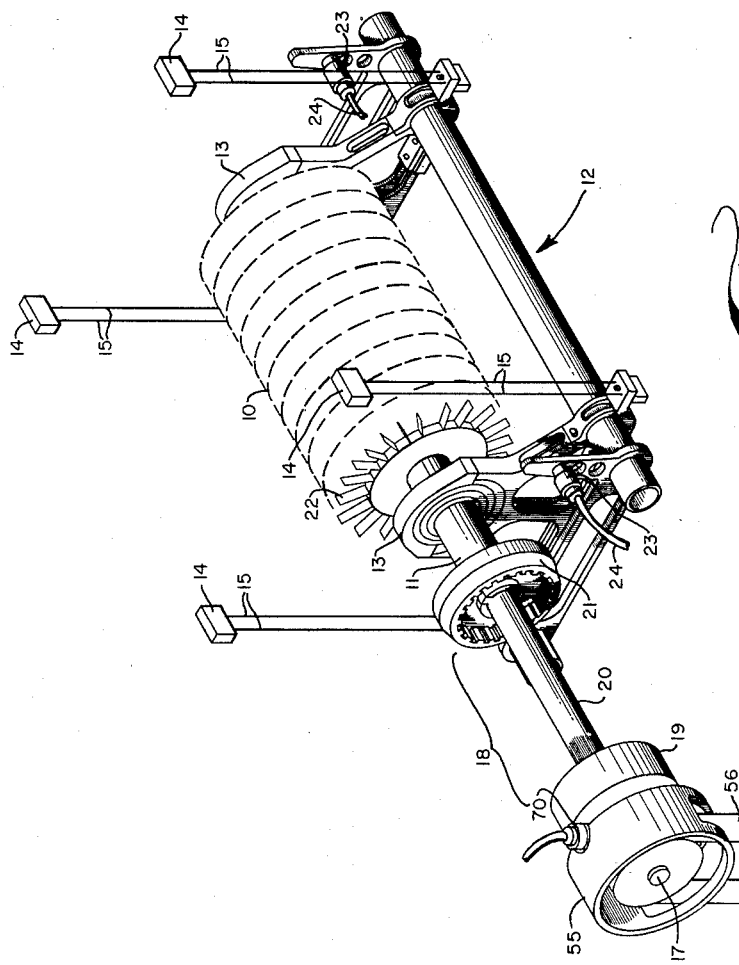
FIGURE 5 is a perspective illustration of the balancing carriage of this invention in operative assembly.

Referring firstly to FIGURE 5, there is illustrated a typical high speed rotor 10 whose high speed distortion characteristics are to be determined. The rotor 10 is mounted on its normal shaft 11 and is secured in a lightweight balancing carriage 12 by means of mounting blocks 13. The configuration of the lightweight carriage 12 forms no part of the present invention. Its function is to support the mounting blocks 13 in rigid relationship. The mounting blocks 13 are separated from the shaft 11 by means of a bearing which preferably is the bearing in which the shaft 11 will be supported in normal operation. The carriage 12 is suspended from brackets 14 by means of flexible wires 15.

Driving means are provided including a drive shaft 17 and a driving belt 56. A coupling 18 connects the drive shaft 17 with the rotor shaft 11. Preferably the coupling 18 is constructed in accordance with my co-pending application Serial No. 840,355, filed September 16, 1959, now abandoned, in favor of a continuation-in-part application Serial No. 38,479, filed June 24, 1960. Such couplings include an internally splined driving socket 19, an internally splined drive socket 21 and a connecting shaft 20 having spherical gears at each end.

As the rotor 10 is turned, vibrations resulting from dynamic unbalance are transmitted to the lightweight carriage 12 whence they are mechanically received by electromechanical transducers 23. The transducers 23 generate an electrical signal corresponding to the mechanical vibrations and transmit the signal through electrical cables 24 to electronic analysis apparatus (not shown) which is adapted to interpret the signal in terms of physical constants of the rotor 10. The transducers 23 may be positioned in a variety of locations with respect to the carriage 12 so long as they receive the resultant mechanical vibrations.

As may be seen from inspection of the rotor 10, turbine blades 22 or similar radial extensions will present substantial aerodynamic resistance to rotation of the rotor 10. Thus while the apparatus illustrated in FIGURE 5 is adequate for dynamic balancing observation of rotors at relatively low speeds, nevertheless at increased speeds substantial driving forces would be required to overcome the aerodynamic resistance of the rotor.

Figure 1:
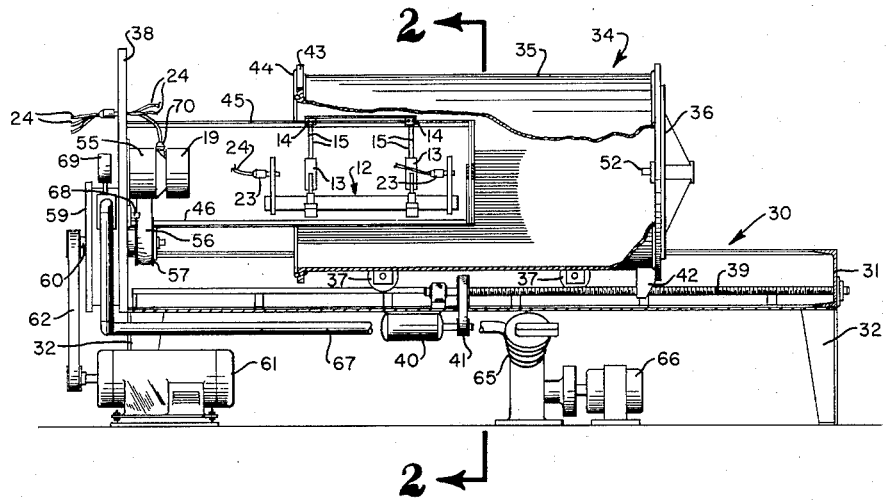
FIGURE 1 is a side elevation, partly in cross-section, of apparatus adapted to the practice of this invention.
Figure 4:
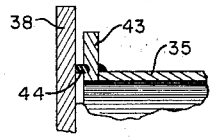
FIGURE 4 is a fragmentary cross-section view illustrating a sealing mechanism suitable for the evacuated chamber of this invention.
Figure 2:
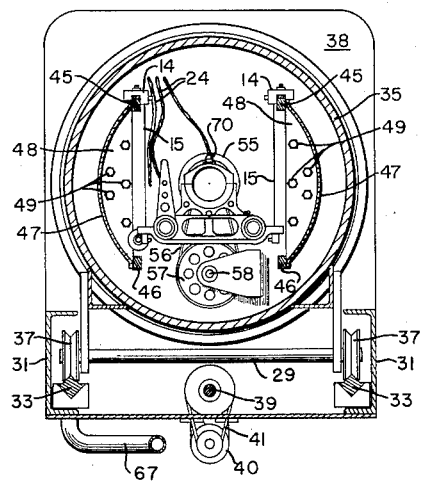
FIGURE 2 is a cross-section illustration taken along the line 2—2 of FIGURE 1 illustrating the relationship of various elements.
Figure 3:
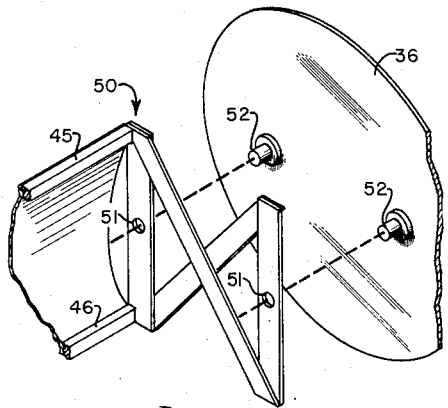
FIGURE 3 is a fragmentary perspective illustration showing a preferred alignment feature which is not clearly brought out in FIGURE 1.

The structure illustrated in FIGURE 5 is positioned within an evacuated chamber according to the present invention. This may be seen by reference to FIGURES 1 and 2.

A support stand 30 is provided including horizontal frame members 31 and legs 32. A pair of parallel rails 33 is horizontally mounted lengthwise of the machine. A cylindrical casing 34 having side walls 35 of circular cross-section and an end wall 36 is supported on wheels 37 secured to an axle 29. The wheels 37 can roll along the rails 33 whereby the casing 34 can move from left to right (FIGURE 1) and vice versa. At one end of the frame 30 is a vertical plate 38 having a flat machined outer surface and extending vertically at right angles to the rails 33. Centrally positioned between the frame elements 31 is a worm gear 39 which can be turned by means of a motor 40 and driving connection 41. A drive nut 42 having internal threads is secured to the shell 34 and is in threaded engagement with the worm gear 39. Turning of the worm gear 39 causes the cylindrical shell 34 to move along the length of the rails 33.

At the open end of the side walls 35 is a radial flange 43 in which an O-ring gasket 44 is positioned. When the cylindrical shell 34 is advanced toward the vertical machined plate 38, the O-ring 44 is compressed against the plate 38 to provide a vapor-tight seal. Thus the cylindrical shell 34 can be moved from one extreme position where the O-ring 44 is compressed against the vertical machined plate 38 to another extreme position where the cylindrical shell 34 is displaced to the right hand side of the support stand 30.

When the cylindrical shell 34 is in abutment with the vertical plate 38, a vapor-tight cylindrical chamber is defined in which the balance testing stand of this invention may be mounted. The cylindrical chamber may be readily evacuated to provide a subatmospheric environment for high speed testing of rotors.

Secured to the vertical plate 38 internally of the cylindrical chamber is a frame for supporting the balancing stand shown in FIGURE 5. The frame includes horizontal parallel upper rails 45 and horizontal parallel lower rails 46. Arcuate plates 47 extend between the upper rails 45 and the lower rails 46 on each side. The forward end of each of the arcuate plates 47 joins a flat plate 48 which is secured to the vertical plate 38 by means of bolts 49. At the end of the rails 45 and 46 remote from the vertical plate 38 is a trussed supporting frame 50 having pin-receiving openings 51. Pins 52 extend from the inner surface of the end wall 36 for entrance into the pin-receiving openings 51 when the cylindrical shell 34 is in a closed position. The pins 52, co-operating with the pin-receiving openings 51, serve to support the balancing frame elements at the end which is remote from the vertical plate 38.

Mounted internally of the vertical plate 38 is a support element 55 for the drive shaft 17. A driving belt 56 and drive pulley 57 similarly are mounted internally of the vertical plate 38. The drive pulley 57 is mounted on a shaft 58 which extends through the vertical plate 38 into a transmission box 59 positioned externally of the vertical plate 38. Gears or pulleys (and belts) are assembled within the transmission box 59 to transmit a rotary drive movement to the shaft 58 from a drive input shaft 60 connected to a drive motor 61 by means of a driving connection such as a belt 62.

The internal drive connections within the transmission box 59 preferably are pulley and belt connections to avoid introducing undesirable vibrations into the driving train which might appear as a chatter in the drive shaft 17. The internal drive connections are speed-increasing to permit the use of a relatively low speed drive source such as the motor 61. An efficient vapor seal is provided where the drive shaft 60 enters the transmission box 59 at a relatively low turning speed. The transmission box 59 is maintained internally at the reduced pressure of the evacuated chamber. Hence the only vapor seal required in the driving train occurs in association with a relatively low speed shaft, i.e., the drive input shaft 60.

A vacuum pump 65, driven by a motor 66, is provided to evacuate the air from the cylindrical chamber. A vacuum conduit 67 extends from the vacuum pump 65 to an inlet port 68 located in the vertical plate 38. A vacuum gauge 69 is provided to indicate externally of the machine the exact pressure within the cylindrical chamber. Valve means may be provided in the vacuum conduit 67 to admit air into the cylindrical chamber when the testing is completed.

A tachometer 70 is positioned on the drive shaft 17 to record the exact speed of the test rotor 10. Electrical cables 24 extend through a vapor-tight opening in the vertical plate 38.

*Operation*

The cylindrical shell 34 is withdrawn from left to right to the extreme position by activating the drive motor 40 which in turn causes the worm gear 39 to rotate in the direction causing the desired movement of the cylindrical shell. The lightweight balancing carriage 12 is aligned by fastening brackets 14 to the upper parallel rails 45. A test rotor 10 is secured in the mounting blocks 13. A suitable coupling 18 is connected between the drive shaft 17 and the rotor shaft 11. The coupling 18 preferably is one which does not generate independent mechanical vibrations during rotation.

The electromechanical transducers 23 are secured in position and the desired pulleys or gearings are assembled within the transmission box 59 to produce the desired speed of rotation in the test rotor 10.

The motor 40 is energized to cause the worm gear 39 to turn until the cylindrical casing 34 is brought into abutment with the vertical plate 38. The O-ring 44 is compressed between the flange 43 and the vertical plate 38 to provide a vapor-tight seal for the cylindrical chamber. The motor 66 is energized to operate the vacuum pump 65 which withdraws the confined air from the chamber through the port 68 and the vacuum conduit 67. When the internal pressure as observed from the vacuum gauge 69 is at a desired level, the motor 61 may be energized to cause rotation of the drive shaft 17 and the rotor 10. The rotor is brought up to the desired operating speed and vibration measurements are obtained from the electro-mechanical transducers 23 according to methods well known in the art.

In a preferred alternative sequence of operations, the rotor 10 is brought up to some fraction of its normal speed for observation prior to closing the cylindrical shell 34. The rotor is directly observed at relatively lower speeds. Thereafter the cylindrical shell is closed by energizing the motor 40 and thereafter the vapor-tight cylindrical chamber is evacuated by energizing the motor 66 until a desired subatmospheric pressure is observed on the gauge 69. At that time, the rotor 10 can be brought up to its normal operating speed.

*Example*

Employing apparatus as illustrated in FIGURES 1 through 5, dynamic distortion testing of a 94-pound vaned rotor at speeds above 24,000 r.p.m. has been accomplished. Theretofore such rotors had been tested by conventional balancing techniques at a test speed of 2,000 r.p.m. The observed vibrations were assumed to be the result of mass eccentricity and suitable corrections were made by adding or subtracting weight in two selected planes transverse to the rotor axis. The observed vibrations were eliminated in a subsequent "proving" observation carried out at the same test speed of 2,000 r.p.m. The compensated rotors, when subjected to their normal operating speeds in excess of 20,000 r.p.m., failed to last in service. The power required to drive this tested rotor in normal service is in excess of 10,000 horsepower. The rotor was tested in the present apparatus by means of a 10-horsepower drive motor.

When the rotors were observed according to the present invention at their normal operating speeds, compensations were made to offset the observed distortions which become apparent in service. The rotors thus corrected have uniformly performed satisfactorily in their required service for periods averaging 25 to 30 times the average service life of similar rotors which were tested for unbalance at test speeds of about 2,000 r.p.m.

While the present drawings have illustrated electro-mechanical transducers 23 in the mechanical vibration sensing means, it should be apparent that other forms of sensing means may be employed including various sensing means which can be maintained out of contact with the test rotor. In addition to the illustrated freely suspended support means, alternative locked support means may be provided to isolate bearing defects from rotor defects. Locked support means can be secured to the upper rails 45 and lower rails 46 if desired.

The high speed rotors preferably should be tested for high speed distortion characteristics while turning in their native bearings, i.e., in the actual bearings which will support the rotors in operation. Moreover the rotors should be tested in the position in which they perform in actual service, i.e., vertical or horizontal as the case may be. The illustrated apparatus applied to rotors which normally turn in a horizontal position.

According to the provisions of the patent statutes, I have explained the principle, preferred embodiment and mode of operation of my invention and have illustrated and described what I now consider to represent its best embodiment. However, I desire to have it understood that, within the scope of the appended claim, the invention may be practiced otherwise than as specifically illustrated and described.

I claim:

Apparatus for determining dynamic distortion of a high speed rotor which comprises a support stand, a tubular shell slideably mounted thereon, said shell having side walls, an end wall at one end and being open at the other end, a vertical plate parallel to the open end of said shell, support means secured to said vertical plate including parallel rails forming a frame for freely suspending rotatable mounting for said rotor, means for sliding said shell toward and away from said vertical plate, sealing means adapted to provide a vapor-tight seal between said vertical plate and the open end of said shell when said open end abuts said vertical plate, a transmission box secured to said vertical plate and having a relatively low speed input drive shaft extended through a wall of said transmission box through a vapor-tight seal, said transmission box further having a relatively high speed output shaft, universal coupling means connecting said output shaft with said rotor, drive means for turning said input shaft at relatively low speeds whereby said rotor is turned at speeds which are substantially its normal operating speeds, means for sensing dynamic distortion of said rotor, and means for evacuating air from the said transmission box and from the chamber defined by said shell and said vertical plate.

References Cited in the file of this patent

UNITED STATES PATENTS

| | | |
|---|---|---|
| 1,990,291 | Larsen | Feb. 5, 1935 |
| 2,575,710 | Hardigg | Nov. 20, 1951 |
| 2,787,907 | King | Apr. 9, 1957 |
| 2,878,942 | Whitmore | Mar. 24, 1959 |

FOREIGN PATENTS

| | | |
|---|---|---|
| 664,160 | Great Britain | Jan. 2, 1952 |
| 808,514 | Great Britain | Feb. 4, 1959 |

OTHER REFERENCES

Advertising brochure of International Research and Development Corporation and the Hicks Corporation, copyright Registration Certificate A 273,086, February 7, 1957.